(12) United States Patent
Jahn

(10) Patent No.: US 6,263,203 B1
(45) Date of Patent: Jul. 17, 2001

(54) METHOD FOR THE DECENTRALLY CONTROLLED, SEAMLESS HANDOVER OF MOBILE TERMINAL EQUIPMENT BETWEEN BASE STATIONS

(75) Inventor: Alfed Jahn, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/289,973

(22) Filed: Apr. 13, 1999

(30) Foreign Application Priority Data

Apr. 16, 1998 (DE) .............................. 198 16 935

(51) Int. Cl.[7] ...................................... H04B 7/00
(52) U.S. Cl. ......................... 455/436; 455/442; 370/332
(58) Field of Search .................... 455/436, 437, 455/438, 439, 440, 442, 444, 445; 370/331, 332

(56) References Cited

U.S. PATENT DOCUMENTS 5,323,446 * 6/1994 Kojima et al. .................. 455/442
5,327,577 * 7/1994 Uddenfeldt ....................... 455/442
6,141,559 * 10/2000 Neumiller et al. ................ 455/443

* cited by examiner

*Primary Examiner*—Thanh Cong Le
(74) *Attorney, Agent, or Firm*—Schiff Hardin & Waite

(57) ABSTRACT

For the seamless handover of a connection that is established from a switching station to a terminal equipment via a first base station, to a path via a second base station, a performance feature of the switching station which is also provided for hardwired communication, such as a three-way conferencing circuit, is activated by one base station, this feature prompting a parallel transmission, to both base stations, of the data to be transmitted in the framework of the connection of the mobile terminal equipment. As soon as the data are present in both base stations, the mobile terminal equipment can relocate the data exchange with the switching station from the first base station to the second base station without interruption. The data transmission from the switching station to the first base station is subsequently terminated.

7 Claims, 2 Drawing Sheets

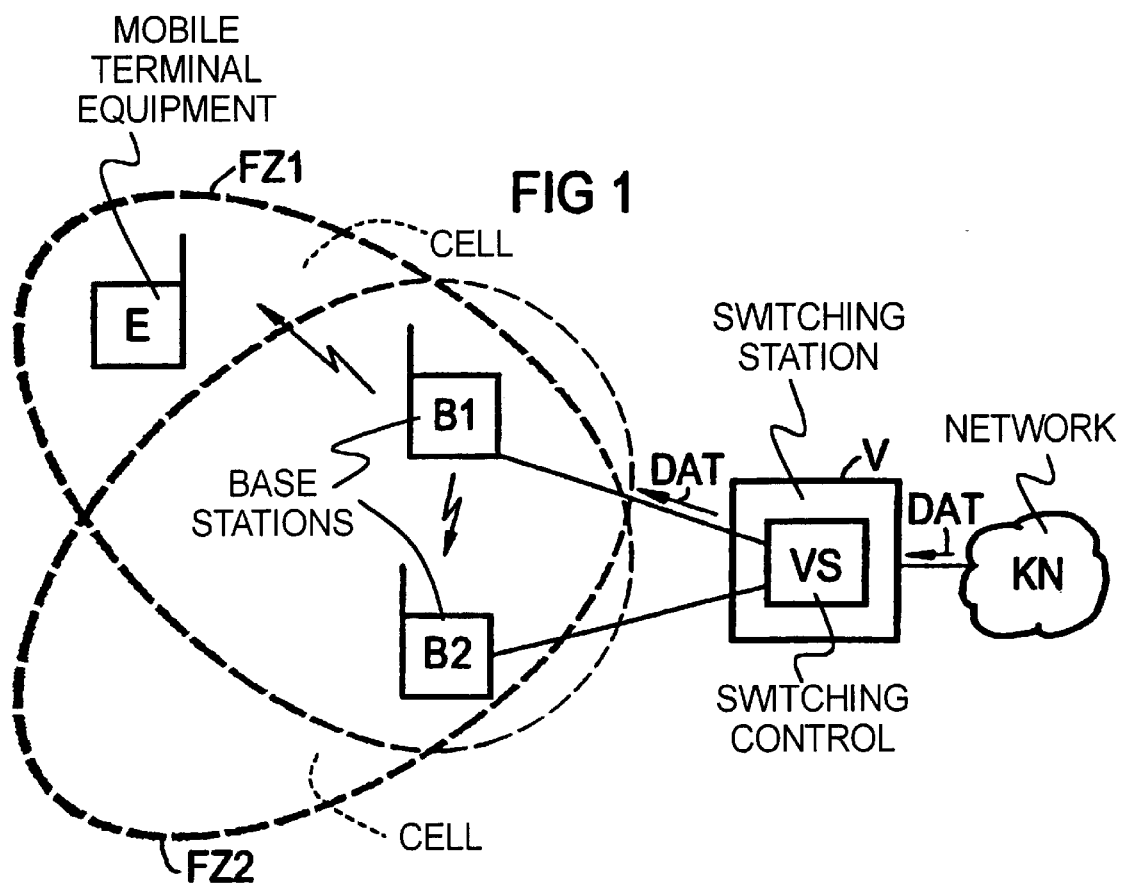
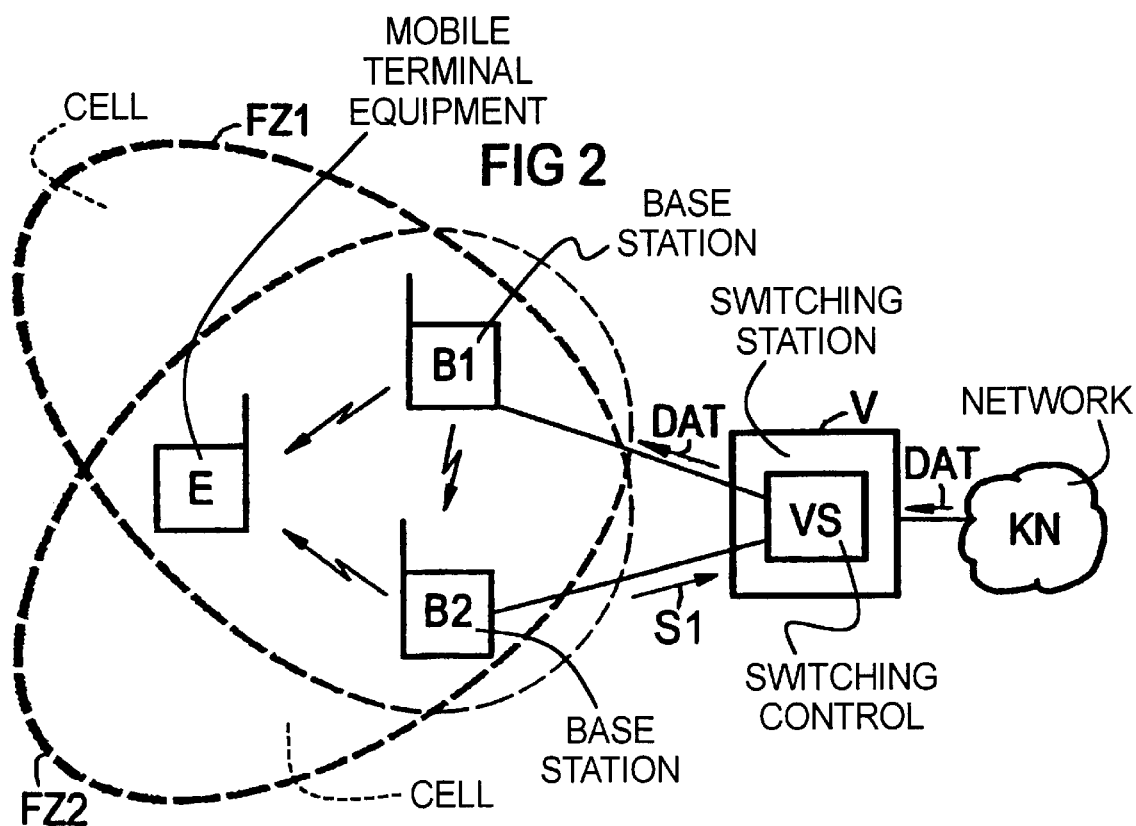

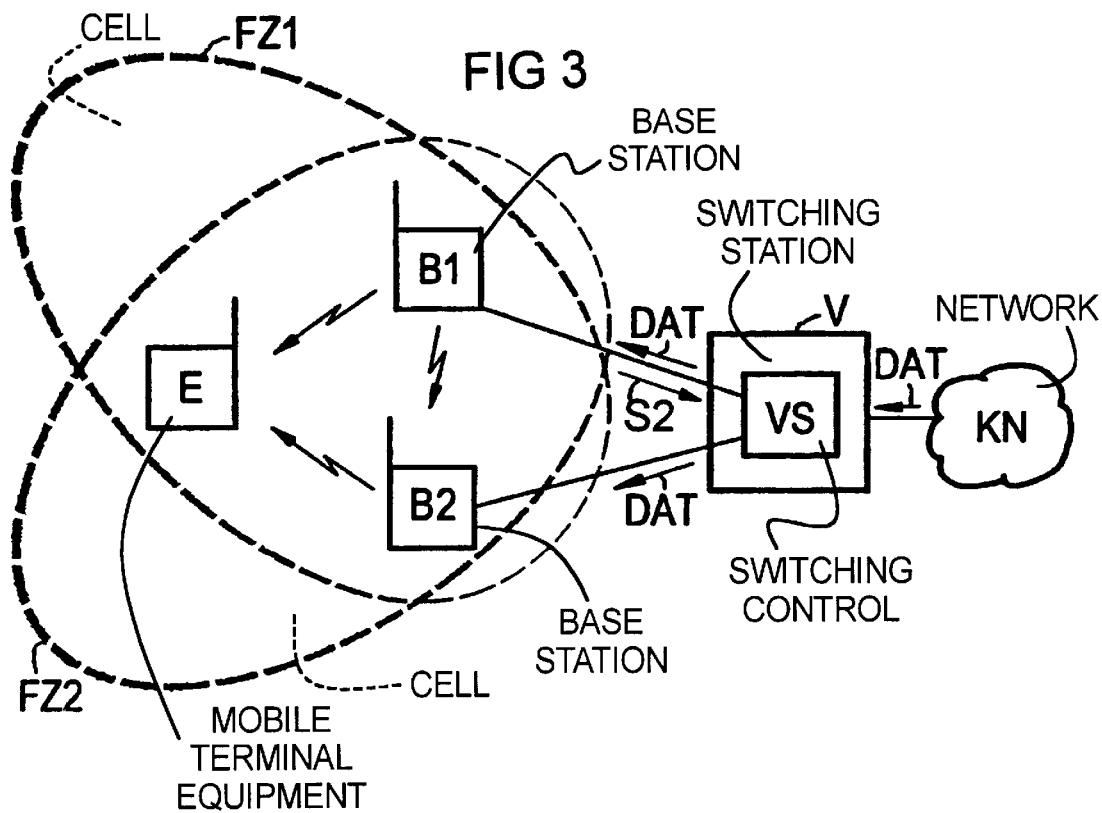
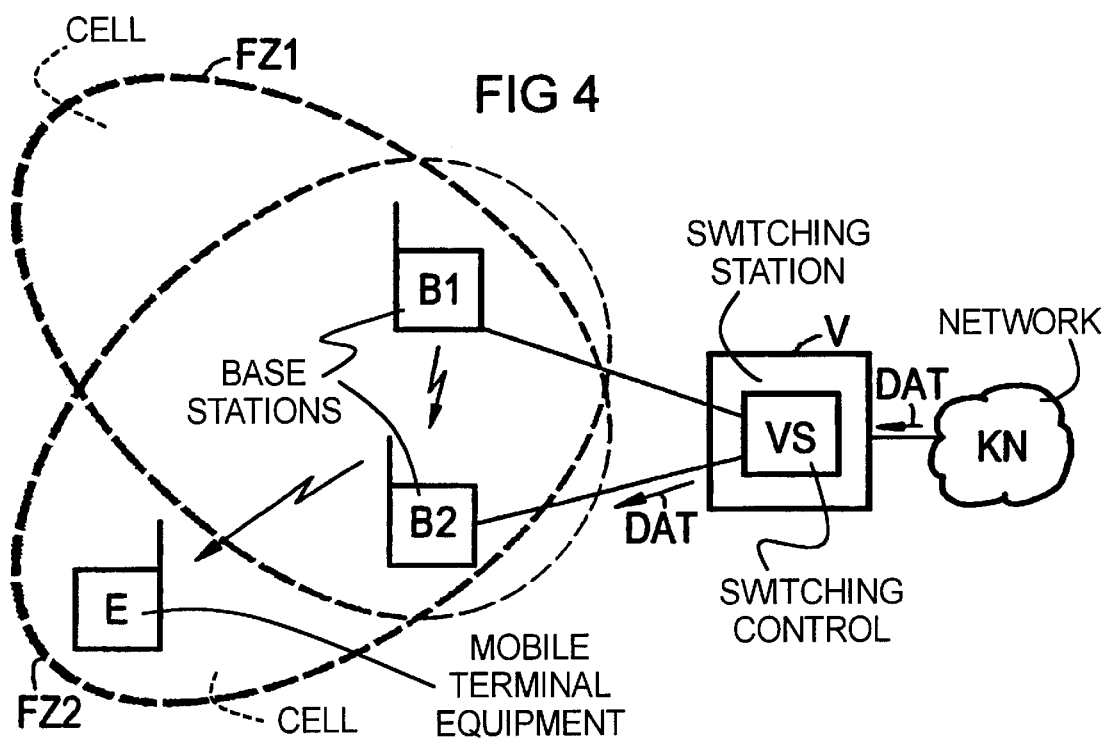

METHOD FOR THE DECENTRALLY CONTROLLED, SEAMLESS HANDOVER OF MOBILE TERMINAL EQUIPMENT BETWEEN BASE STATIONS

BACKGROUND OF THE INVENTION

1. Field of the Invention

The present invention relates to a method for controlling handover of mobile terminal equipment between base stations in a communication system, such as a cellular system, and in particular to a method for seamless handover of mobile terminal equipment in such a system.

2. Description of the Prior Art

In many communication systems, terminal equipment which can serve a variety of purposes, such as a transmission of speech, video, fax, file, program and/or measurement data, is increasingly being connected wirelessly. A connection to such mobile terminal equipment is typically set up via base stations, which are coupled to the mobile terminal equipment via air interfaces. It is common to in turn couple the base stations to a switching station, via which connections to the mobile terminal equipments are switched. The switching station can be coupled to an external communication network making it possible to establish connections between the mobile terminal equipment and external terminal equipments as well.

The area around a base station in which a wireless connection of a given quality to a mobile terminal equipment is possible via this base station is designated as the radio cell of this base station. In order to supply a larger area with connection opportunities, a number of base stations are usually distributed over the area to be serviced, so that their radio cells form a network which has full coverage, i.e., the network occupies the entire area to be serviced. These radio cells are classified as picocells, microcells, or macrocells, depending on their spatial coverage. The user of mobile terminal equipment which is coupled to the switching station via a first base station can exit the radio cell of this first base station and enter the radio cell of a neighboring base station. In this case, the path of the existing connection must be relocated from the first base station to the neighboring base station. Such a change of the path of the connection is usually referred to as "connection handover". A significant problem is that, during the change of the connection path, a loss-free data transfer within the connection must be guaranteed, and an interruption of the data transmission must be avoided, if possible. An handover without interruption is typically referred to as a "seamless handover", meaning a change which cannot be perceived by the user.

In known methods, a handover is controlled by a central mobile switching assembly, which is provided for this purpose, this assembly functioning as an interface between the base stations and the switching station. The base stations participating in the connection handover must exchange information about the change of the radio cell, together with information for connection management, with the central mobile switching assembly, which then effects a rerouting of the data to be transmitted to the mobile terminal equipment from the base station which is handing over the connection to the base station which is taking over the connection. Arrangements and methods of this type are taught in *Cordless Telecommunications in Europe* (Tuttlebee, Wally H. W. (Ed); Springer; London, 1990: 43–48,273–275), for example.

Equipment designed for hardwired communication are frequently employed as switching stations. In these cases, the central mobile switching assembly is controlled at the switching station side in a manner like a group of hardwired terminal equipment units. This control must be converted by the connected mobile switching assembly into a suitable control for the management of wireless communication equipment at the side of the connected base stations. In particular, the central mobile switching assembly must independently control or manage all the processes specific to a wireless communication, such as the processes associated with a change of the radio cell. The functionality required for this is generally very comprehensive, and corresponding mobile switching assemblies are thus relatively expensive.

SUMMARY OF THE INVENTION

An object of the present invention is to provide a method for changing a connection which is established from mobile terminal equipment to a switching station via a first base station, to a path via a second base station, which does not require the connection of a central mobile switching assembly between the base stations and the switching station.

The above object is achieved in accordance with the principles of the present invention in a method for the seamless handover of a connection which proceeds wirelessly from a switching station to mobile terminal equipment via a first base station coupled to the switching station, to a path to the mobile terminal equipment via a second base station also coupled to the switching station wherein, given an existing connection via the first base station, if it is determined that wireless data transmission between the mobile terminal equipment and the first base station no longer satisfies a predetermined quality criterion, and if there is a second base station located in radio range of the mobile terminal equipment to which a wireless data transmission of the predetermined quality is possible, then a specially dedicated control signal is transmitted from a base station to the switching station, and the control signal causes at least one performance feature of the switching station for the parallel transmission of data to a number of destinations to be activated, so that the data to be transmitted in the framework of the connection are transmitted by the switching station to the first base station as well as to the second base station. Once the data to be transmitted to the mobile terminal equipment are present at both stations, the mobile terminal equipment terminates the data exchange with the switching station via the first base station and continues data exchange with the switching station via the second base station, without an interruption of data transmission. By means of another control signal transmission from a base station to the switching station, the data transmission from the switching station to the first base station is terminated, so that only the second base station is still supplied with the data to be transmitted to the mobile terminal equipment.

In the inventive method, in a connection between mobile terminal equipment and the switching station via a first base station, a handover is prompted when it is detected by the mobile terminal equipment or by the first base station that the wireless data transmission between the mobile terminal equipment and the first base station no longer correspond to a prescribed quality criterion, and when it is also detected that a second base station is located in the radio range of the mobile terminal equipment, to which station a data transmission of a prescribed quality is possible. A handover can also be triggered given an overload of the first base station, for example.

For the handover, a control signal, such as that according to the ETSI standard definition for signaling QSIG for private networks, or DSS1 for public networks, or according to other ITU-T standard definitions, is transmitted to the switching station by a base station, preferably one of the base stations participating in the handover. On the basis of the control signal, a performance feature of the switching station for parallel transmission of data to a plurality of transmission destinations, which feature is also provided for hardwired communication, is subsequently activated. Preferably, a standardized performance feature for In an inventive method, in a connection between a mobile terminal equipment and the switching station via a first base station, a handover is prompted when it is detected by the mobile terminal equipment or by the first base station that the wireless data transmission between the mobile terminal equipment and the first base station no longer correspond to a prescribed quality criterion, and that a second base station is located in the radio range of the mobile terminal equipment, to which station a data transmission of a prescribed quality is possible. A handover can also be triggered given an overload of the first base station, for example.

For the handover, a control signal, such as that according to the ETSI standard definition for signaling OSIG for private networks, or respectively, DSS1 for public networks, or according to other ITU-T standard definitions, is transmitted to the switching station by a base station, preferably one of the base stations participating in the handover. On the basis of the control signal, a performance feature of the switching station for parallel transmission of data to a plurality of transmission destinations, which feature is also provided for hardwired communication, is subsequently activated. Preferably, a standardized performance feature for hardwired communication can be used, such as a three-way conferencing circuit (3PTY), a point-to-multipoint connection from the switching station to the two base stations, or other performance features according to the ETSI standard for ISDN. The performance feature, or respectively, the combination of performance features, is activated in such a way that the data to be transmitted to the mobile terminal equipment in the framework of a connection are transmitted from the switching station not only to the first base station, but also to the second base station.

Once the data to be transmitted to the mobile terminal equipment are present at the two base stations, the mobile terminal equipment terminates a data exchange with the switching station which is running via the first base station, in order to continue this data exchange with the switching station via the second base station. Since the data to be communicated to the mobile terminal equipment are present in both stations in parallel, an interruption of the data exchange can usually be avoided.

Subsequent to this, another control signal (e.g. according to the ETSI standard * definition for signaling QSIG for private networks, or respectively, DSS1 for public networks, or to other ITU-T standard definitions) is transmitted to the switching station by a base station, preferably by one which is participating in the handover. On the basis of this control signal, the data transmission from the switching station to the first base station is terminated. A performance feature which is standardized for hardwired communication can be used for terminating this data transmission, such as one according to the ETSI standard for ISDN. If a three-way conferencing circuit has been previously established by the activation of the first performance feature, the data transmission to the first base station can be terminated in that the first base station is disconnected from the three-way conference.

The use of performance features which are also provided for hardwired communication enables the employment of switching stations which are designed for hardwired communication in the realization of the inventive method without modification, and thus inexpensively. The execution of the inventive method does not require any modifications at mobile terminal equipments, either, so that terminal equipments already present can continue to be used. Only the base stations require minor modifications in order to enable the execution of the control functions that are required for the realization of an inventive method. Furthermore, the base stations can be connected directly to the switching station without an intermediate connection of expensive mobile switching assemblies.

Since a seamless handover requires only a small outlay in the inventive method, such handovers can follow one another in relatively short intervals, which proves advantageous particularly in radio networks with small radio cells (picocells and microcells).

An inventive method can be realized with air interfaces according to different standards between the terminal equipment and base stations, whereby it is also possible to combine several standards. Advantageous embodiments emerge particularly with air interfaces according to the ETSI standard definition DECT (Digital Enhanced Cordless Telecommunications), DCS (Digital Cellular System,) or GSM (Global System for Mobile Communication), or with an air interface according to the UMTS definition (Universal Mobile Telecommunication System), which has been recommended for standardization, or with air interfaces according to the ARI standard definition PHS (Personal Handphone System).

According to an advantageous development of the Inventive method, the first and second base stations can exchange signals which are utilized for time synchronization of the base stations. A time synchronization of the base stations facilitates a seamless handover. If the data transmission between the mobile terminal equipment and the base stations is based on a time-division multiple access method, then a time synchronization of the participating base stations is even compulsory for a seamless handover.

According to another advantageous development, base stations exchange data among themselves about a system identifier of the base stations, e.g. what is known as an EIC identifier. In this way, it can be guaranteed that the base stations can be recognized by a mobile terminal equipment as belonging to a common communication system, thereby simplifying the administration of the communication system, particularly during the handover process.

It is also possible for a data exchange between a base station and a switching station to be led via at least one other base station which is coupled to the switching station. In such a case, the former base station does not require a direct connection to the switching station for integration into the communication system, but rather requires only contact with another base station. This often requires less outlay.

Another advantageous development of the Invention provides that an exchange of data and/or signals between base stations occurs wirelessly. For the wireless communication between the base stations, the transmit and receive means already present in the base stations can preferably be used. The transmission protocol which is provided for the data exchange with the mobile terminal equipments can be used as the transmission protocol here. A base station can thus be wirelessly integrated into the communication system. A base station via which another base station is wirelessly coupled to the switching station is often referred to as a repeater. communication can be used, such as a three-way conferencing circuit (3PTY), a point-to-multipoint connection from the switching station to the two base stations, or other performance * features according to the ETSI standard for ISDN. The performance feature, or a combination of performance features, is activated so that the data to be transmitted to the mobile terminal equipment in the framework of a connection are transmitted from the switching station not only to the first base station, but also to the second base station.

Once the data to be transmitted to the mobile terminal equipment are present at the two base stations, the mobile terminal equipment terminates a data exchange with the switching station which is operating via the first base station, in order to continue this data exchange with the switching station via the second base station. Since the data to be communicated to the mobile terminal equipment are present in both stations in parallel, an interruption of the data exchange usually can be avoided.

Subsequent to this, another control signal (e.g. according to the ETSI standard definition for signaling QSIG for private networks, or DSS1 for public networks, or other ITU-T standard definitions) is transmitted to the switching station by a base station, preferably by one which is participating in the handover. On the basis of this control signal, the data transmission from the switching station to the first base station is terminated. A performance feature which is standardized for hardwired communication can be used for terminating this data transmission, such as one according to the ETSI standard for ISDN. If a three-way conferencing circuit has been previously established by the activation of the first performance feature, the data transmission to the first base station can be terminated by disconnecting the first base station from the three-way conference.

The use of performance features which are also provided for hardwired communication enables the employment of switching stations which are designed for hardwired communication in the realization of the inventive method without modification, and thus inexpensively. The execution of the inventive method does not require any modifications at the mobile terminal equipment either, so that terminal equipment already present can continue to be used. Only the base stations require minor modifications in order to enable the execution of the control functions that are required for the realization of an inventive method. Furthermore, the base stations can be connected directly to the switching station without an intermediate connection of expensive mobile switching assemblies.

Since a seamless handover requires only a small outlay in the inventive method, such handovers can follow one another in relatively short intervals, which proves advantageous particularly in radio networks with small radio cells (picocells and microcells).

The inventive method can be realized with air interfaces according to different standards between the terminal equipment and base stations; it is also possible to combine several standards. Advantageous embodiments particularly employ air interfaces according to the ETSI standard definition DECT (Digital Enhanced Cordless Telecommunications), DCS (Digital Cellular System,) or GSM (Global System for Mobile Communication), or with an air interface according to the UMTS definition (Universal Mobile Telecommunication System), which has been recommended for standardization, or with air interfaces according to the ARI standard definition PHS (Personal Handphone System).

In an embodiment of the inventive method, the first and second base stations can exchange signals which are utilized for time synchronization of the base stations. A time synchronization of the base stations facilitates a seamless handover. If the data transmission between the mobile terminal equipment and the base stations is based on a time-division multiple access method, then a time synchronization of the participating base stations is even compulsory for a seamless handover.

In another embodiment, base stations exchange data among themselves with respect to a system identifier of the base stations, e.g. an identifier known as an EIC identifier. In this way, it can be guaranteed that the base stations can be recognized by a mobile terminal equipment as belonging to a common communication system, thereby simplifying the administration of the communication system, particularly during the handover process.

It is also possible for a data exchange between a base station and a switching station to proceed via at least one other base station which is coupled to the switching station. In such a case, the former base station does not require a direct connection to the switching station for integration into the communication system, but rather requires only contact with another base station. This often requires less outlay.

In another embodiment of the Invention an exchange of data and/or signals between base stations occurs wirelessly. For the wireless communication between the base stations, the transmit and receive unit which are already present in the base stations preferably can be used. The transmission protocol which is provided for the data exchange with the mobile terminal equipments can be used as the transmission protocol here. A base station thus can be integrated wirelessly into the communication system. A base station via which another base station is wirelessly coupled to the switching station is often referred to as a repeater.

DESCRIPTION OF THE DRAWINGS

FIGS. 1 to 4 schematically illustrate a communication system operating in accordance with the inventive method with a mobile terminal equipment connected to a switching station via base stations, with respectively different connection paths.

DESCRIPTION OF THE PREFERRED EMBODIMENTS

FIGS. 1 to 4 respectively depict a communication system which is composed of a switching station V, with switching control VS, the station V being coupled to a communication network KN, two base stations B1 and B2, which are connected to the switching station V, with respective appertaining radio cells FZ1 and FZ2, and mobile terminal equipment E; for example, a wireless telephone according to the DECT standard or a mobile telephone according to the GSM standard. The mobile terminal equipment E is wirelessly connected, via alternating base stations, to the switching station V, via which the connection into the communication network KN proceeds. A wireless coupling is indicated by a communication link symbol. To practice the inventive method, it is sufficient to utilize a (relatively) less expensive switching station V which is designed for hardwired communication systems and which has performance features that are standardized for hardwired communication only. The base stations B1 and B2 are situated within each other's radio cell, so that these base stations can exchange data and/or signals with each other, i.e. without a detour via the switching station V, wirelessly, i.e. via a DECT air interface. In this exemplary embodiment, signals which enable a precise time synchronization of the two base stations B1 and B2 are exchanged by the base stations. The two base stations B1 and B2 thus can be synchronized with respect to the mobile terminal equipment in the handover process, which is a precondition for a seamless handover. In addition, information is exchanged about which mobile terminal equipment is currently allocated to which base station at that time.

The number of base stations that are connected to the switching station V and the number, form and arrangement of the radio cells is to be considered only an idealization which serves to simplify the description below.

In FIG. 1, the mobile terminal equipment unit E is located in the radio cell FZ1 of the base station B1, but still outside the radio cell FZ2 of the base station B2. In the framework of the connection into the communication network KN which is set up via the base station B1, data DAT are transmitted from the communication network KN to the mobile terminal equipment E via the switching station V and the base station B1. The mobile terminal equipment E regularly monitors the quality of the wireless data transmission from, or respectively, to the base station B1. If this quality deteriorates, for example, because the terminal equipment E approaches the margin of the radio cell FZ1, the mobile terminal equipment E attempts to find another base station within radio range with which a wireless communication of the prescribed quality is possible.

FIG. 2 depicts the status immediately after such a base station, here the base station B2, has been found, i.e. after the mobile terminal equipment E has entered the radio cell FZ2 thereof, but is at the same time still located in the radio cell FZ1. In this case, the mobile terminal equipment E transmits (e.g. according to the DECT standard) what is known as a connection handover request message requesting a second connection to the base station B2. This prompts the base station B2 to transmit a control signal S1 to the switching control VS—preferably according to the ETSI standard definition for signaling QSIG for private networks, or respectively, DSS1 for public networks—for the setup of a three-way conferencing circuit between the base stations B1 and B2 and the connection partner of the mobile terminal equipment in the communication network KN. A three-way conferencing circuit is a very common and standardized (e.g. according to the ETSI standard for ISDN) performance feature of switching stations in the field of hardwired communication as well.

FIG. 3 depicts how, in the framework of the established three-way conferencing circuit, the data DAT transmitted to the base station B1 by the switching station V are also transmitted in parallel fashion to the base station B2. As soon as the data DAT to be transmitted to the mobile terminal equipment E are present in both base stations B1 and B2, the mobile terminal equipment E can abort the data exchange with the switching station V via the base station B1 and resume this via the base station B2, generally without interruption.

Subsequent to the aborting of the data exchange via the base station B1, the base station B1 sends a control signal S2 to the switching control VS, preferably according to the ETSI standard definition for signaling QSIG for private networks, or DSS1 for public networks, for disconnection from the three-way conference. In the simplest case, this can occur by means of a control signal which would typically indicate a subscriber hang-up. Performance features for disconnection from a three-way conference are also very common in switching stations and have also been standardized many times for hardwired communication, such as in ETSI standards for ISDN.

FIG. 4 depicts the status after the base station B1 has disconnected from the three-way conference. In this phase, the base station B2 is still supplied by the switching station V with the data DAT to be transmitted, and from the point of view of the switching station V, there is still a two-point connection. The handover process is thus complete, and the mobile terminal equipment can exit the radio cell FZ1 of the base station B1 and still maintain the connection.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for seamlessly handing over a connection from mobile terminal equipment, having a radio range, in a communication system having a plurality of base stations and a switching station, comprising the steps of:

establishing a transmission connection from said mobile terminal equipment to said switching station via a first base station;

monitoring said transmission connection with respect to a predetermined quality criterion;

if and when said transmission connection fails to satisfy said predetermined quality criterion, determining whether a second base station exists in said radio range of said mobile terminal equipment to which a different transmission connection can be made which satisfies said predetermined quality criterion, and if so, transmitting a first control signal from one of said first and second base stations to said switching station;

upon receipt of said first control signal at said switching station, activating a transmission mode at said switching station selected from the group consisting of transmission modes usable for hardwired transmission, for simultaneously transmitting data from said switching station to a plurality of base stations;

using said transmission mode, transmitting data from said switching station to each of said first and second base stations;

after both of said first and second base stations are receiving data from said switching station, said mobile terminal equipment terminating transmission to said switching station via said first base station and continuing to transmit to said switching station via said second base station without any interruption in transmission between said mobile telephone equipment and said switching station; and one of said first and second base stations transmitting a second control signal to said switching station and said switching station, upon receipt of said second control signal, terminating data transmission to said first base station.

2. A method as claimed in claim 1 wherein the step of activating said transmission mode at said switching station comprises activating a three-way conferencing transmission mode at said switching station.

3. A method as claimed in claim 2 wherein the step of terminating data transmission from said switching station to said first base station comprises disconnecting said first base station from said three-way conference.

4. A method as claimed in claim 1 wherein the step of activating said transmission mode at said switching station comprises activating a point-to-multipoint connection between said switching station and said first and second base stations.

5. A method as claimed in claim 1 wherein the step of establishing said transmission connection from said mobile terminal equipment to said switching station comprises establishing said transmission connection from said mobile terminal equipment to said switching station via said first base station and at least one other base station in said plurality of base stations.

6. A method as claimed in claim 1 comprising the additional step of exchanging a time synchronization signal between said first base station and said second base station.

7. A method as claimed in claim 1 comprising conducting all transmissions among said mobile telephone equipment, said first base station, said second base station and said switching station wirelessly.

* * * * *